US009950667B2

(12) United States Patent
Lee et al.

(10) Patent No.: US 9,950,667 B2
(45) Date of Patent: Apr. 24, 2018

(54) VEHICLE SYSTEM FOR DETECTING OBJECT AND OPERATION METHOD THEREOF

(71) Applicants: HYUNDAI MOBIS Co., Ltd., Yongin-si, Gyeonggi-do (KR); SOGANG UNIVERSITY RESEARCH FOUNDATION, Seoul (KR)

(72) Inventors: Sung Joo Lee, Yongin-si (KR); Gyeong Hwan Kim, Seoul (KR); Hyug Jae Lee, Seoul (KR)

(73) Assignees: HYUNDAI MOBIS CO., LTD., Yongin-si, Gyeonggi-do (KR); SOGANG UNIVERSITY RESEARCH FOUNDATION, Seoul (KR)

(*) Notice: Subject to any disclaimer, the term of this patent is extended or adjusted under 35 U.S.C. 154(b) by 187 days.

(21) Appl. No.: 14/962,402

(22) Filed: Dec. 8, 2015

(65) Prior Publication Data

US 2016/0176345 A1    Jun. 23, 2016

(30) Foreign Application Priority Data

Dec. 19, 2014 (KR) ........................ 10-2014-0184737

(51) Int. Cl.
*G06K 9/46* (2006.01)
*B60Q 9/00* (2006.01)
(Continued)

(52) U.S. Cl.
CPC ......... *B60Q 9/008* (2013.01); *G06K 9/00805* (2013.01); *G06K 9/4604* (2013.01);
(Continued)

(58) Field of Classification Search
CPC .. B60Q 9/008; G06K 9/00805; G06K 9/4604; G06T 2207/10016;
(Continued)

(56) References Cited

U.S. PATENT DOCUMENTS

| 6,222,447 | B1* | 4/2001 | Schofield | ............... | B60N 2/002 |
| | | | | | 340/435 |
| 7,747,039 | B2* | 6/2010 | Fujimoto | ........... | G06K 9/00362 |
| | | | | | 340/435 |
| 2004/0057600 | A1* | 3/2004 | Niwa | .................... | B60R 25/104 |
| | | | | | 382/103 |

(Continued)

FOREIGN PATENT DOCUMENTS

| JP | 5083142 B2 | 11/2012 |
| JP | 2013097390 A | 5/2013 |

(Continued)

OTHER PUBLICATIONS

Kum et al, Lane detection system with around view monitoring for intelligent vehicle, 2013.*

(Continued)

*Primary Examiner* — Shan E Elahi
(74) *Attorney, Agent, or Firm* — Paratus Law Group, PLLC (57) ABSTRACT

A vehicle system for detecting an object, including: an image input unit installed at the front or the rear of a vehicle to capture images in the vicinity of the vehicle; an image processing unit converting the image input from the image input unit; an object detecting unit analyzing the images converted by the image processing unit and extracting key points for a background of the images to detect a moving object approaching the vehicle; an interface unit including an input means for the vehicle and an output means outputting information; and a control unit controlling a warning for the moving object to be detected from the object detecting unit and output through the interface.

15 Claims, 8 Drawing Sheets

(51) Int. Cl.
 *G06K 9/00* (2006.01)
 *G06T 7/246* (2017.01)

(52) U.S. Cl.
 CPC .... *G06T 7/246* (2017.01); *G06T 2207/10016* (2013.01); *G06T 2207/30261* (2013.01); *G06T 2207/30264* (2013.01)

(58) Field of Classification Search
 CPC . G06T 2207/30261; G06T 2207/30264; G06T 7/246
 USPC ........................................................ 348/148
 See application file for complete search history.

(56) References Cited

U.S. PATENT DOCUMENTS

| | | | | |
|---|---|---|---|---|
| 2006/0056056 | A1* | 3/2006 | Ahiska | G08B 13/19608 359/690 |
| 2007/0076918 | A1* | 4/2007 | Dai | G06K 9/00771 382/104 |
| 2007/0095588 | A1* | 5/2007 | Mattes | B60T 8/172 180/197 |
| 2007/0165910 | A1* | 7/2007 | Nagaoka | B60W 40/04 382/104 |
| 2011/0228985 | A1* | 9/2011 | Uchida | G06T 7/215 382/103 |
| 2012/0224064 | A1* | 9/2012 | Euler | B60R 1/00 348/148 |
| 2013/0286193 | A1* | 10/2013 | Pflug | B60R 1/00 348/135 |
| 2013/0308821 | A1* | 11/2013 | Okada | G06K 9/00624 382/103 |
| 2014/0118551 | A1* | 5/2014 | Ikeda | B60R 1/00 348/148 |
| 2014/0320658 | A1* | 10/2014 | Pliefke | B60R 1/002 348/148 |
| 2015/0269733 | A1* | 9/2015 | Kosaki | G06T 7/0044 382/107 |

FOREIGN PATENT DOCUMENTS

| | | |
|---|---|---|
| KR | 1020080004926 A | 1/2008 |
| KR | 101396838 B1 | 5/2014 |

OTHER PUBLICATIONS

Mar. 1, 2016, Korean Office Action for related KR application No. 10-2014-0184737.

* cited by examiner

VEHICLE SYSTEM FOR DETECTING OBJECT AND OPERATION METHOD THEREOF

CROSS-REFERENCE TO RELATED APPLICATIONS

The present application claims priority to Korean Patent Application Number 10-2014-0184737 filed Dec. 19, 2014, the entire contents of which application is incorporated herein for all purposes by this reference.

TECHNICAL FIELD

The present invention relates to a vehicle system for detecting an object and an operation method thereof, and more particularly, to a vehicle system for detecting an object and an operation method thereof which detect neighboring vehicles to give a warning when a vehicle is driven on a road.

BACKGROUND

In recent years, there is a trend in which a system is mounted on a vehicle, which assists driving of a vehicle and detects a surrounding situation and provides information on the detected surrounding situation for convenience of a driver.

In the related art, as disclosed in JP5083142, keypoints of a moving object is found and the moving object is detected based on the keypoints.

However, the keypoints of the moving object has a problem in that since the object moves, it is relatively more difficult to detect and track the object than a background. Further, when the keypoints is not shown on the object, it is difficult to detect the object. It is difficult to sufficiently express an area with respect to the moving object only by the keypoints.

As disclosed in US2011-0228985, by an optical flow based scheme that estimates the entire motion of an image, a calculation amount is large, and as a result, a calculation load increases. Further, there is a limit even in the resulting processing speed.

In this case, a movement area is detected by detecting a speed vector having a specific direction, but since the motion of the object is not analyzed, but whether to access the area by using a size change of the area is determined, that is, since the corresponding object is determined as an access object when the area of the object increases with time, a motion of an actually moving object is not reflected.

As described above, in the related art, in detecting the object and reflecting the detected moving object to driving, it is difficult to detect the object, and as a result, a scheme for more effectively detecting the moving object is required.

SUMMARY

The present invention has been made in an effort to provide a vehicle system for detecting an object and an operation method thereof which effectively detect a moving object around a vehicle and detect an object approaching the vehicle to output a route.

An exemplary embodiment of the present invention provides a vehicle system, for detecting an object including: an image input unit installed at the front or the rear of a vehicle to capture images in the vicinity of the vehicle; an image processing unit converting the image input from the image input unit; an object detecting unit analyzing the image converted by the image processing unit and extracting keypoints for a background of the image to detect a moving object approaching the vehicle; an interface unit including an input means for the vehicle and an output means outputting information; and a control unit controlling a warning for the moving object to be detected from the object detecting unit and output through the interface.

The object detecting unit may extract the keypoints for the background among a plurality of keypoints of the image as a background feature and track a motion of the background feature in the consecutively input images to detect the moving object.

The object detecting unit may compare a previous image and a current image, warps the current image from the previous image by using the motion of the background feature, and generate a difference image between the warped image and the current image to detect the moving object.

Another exemplary embodiment of the preset invention provides an operation method of a vehicle system for detecting an object including: extracting keypoints by analyzing an input image; extracting a background feature for an area which becomes a background among the extracted keypoints and detecting a motion of the background feature; analyzing a motion of a vehicle to correspond to the motion of the background feature and detecting a moving object from an area which moves differently from the motion of the vehicle; determining whether the moving object approaches the vehicle; and outputting a warning when the moving object approaches the vehicle.

According to exemplary embodiments of the present invention, in a vehicle system for detecting an object and an operation method thereof, since a background image of a current image is estimated by using a motion of keypoints that belongs to a background and an approaching object is extracted and detected by using a difference image from the current image, it is easy to detect the object and a calculation amount depending on the object detection is small, and as a result, the resulting load decreases and real-time processing is easy and accuracy of approaching determination of a moving object is improved and the approaching object can be detected under various environments without making a specific target be learned and a warning is output to the approaching object through monitoring a blind spot, thereby improving convenience and safety of a driver.

The effects of the present invention are not limited to the aforementioned effects, and other effects, which are not mentioned above, will be apparent to those skilled in the art from the description included in the appended claims.

DETAILED DESCRIPTION

Various advantages and features of the present invention and methods accomplishing thereof will become apparent from the following description of embodiments with reference to the accompanying drawings. However, the present invention is not limited to exemplary embodiments to be disclosed below, but various forms different from each other may be implemented. The exemplary embodiments are merely intended to make the disclosure of the present invention complete and to completely notify the person with ordinary skill in the art, to which the present invention belongs, of the scope of the invention, and the present invention is only defined by the scope of the claims. Like reference numerals indicate like elements throughout the specification.

Hereinafter, exemplary embodiments of the present invention will be described with reference to the accompanying drawings.

Figure 1:
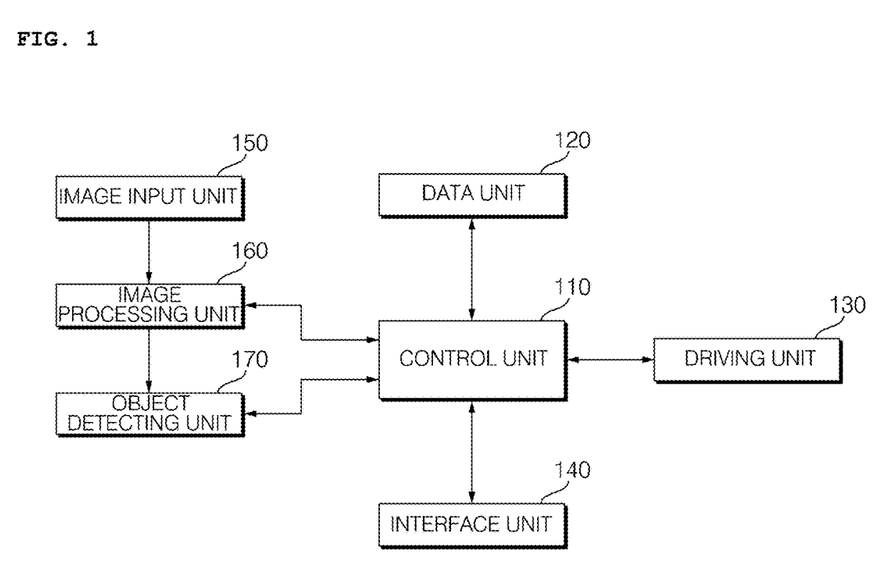
FIG. 1 is a block diagram illustrating a control configuration of a vehicle system for detecting an object according to an exemplary embodiment of the present invention.

FIG. 1 is a block diagram illustrating a control configuration of a vehicle system for detecting an object according to an exemplary embodiment of the present invention.

The vehicle system for detecting an object of the present invention includes an image input unit 150, an image processing unit 160, an object detecting unit 170, a data unit 120, a driving unit 130, an interface unit 140, and a control unit 110 electronically controlling an overall operation of a vehicle as illustrated in FIG. 1.

The vehicle includes components such as an engine or a motor for driving the vehicle, a transmission, and the like and may further include a plurality of sensors, but a description thereof will be omitted below.

The interface unit 140 includes an input means (not illustrated) including a plurality of switches for inputting a predetermined signal by an operation by a driver and an output means (not illustrated) outputting information while an electric vehicle is operating in a current state. Further, the interface unit 140 includes operating means for driving, such as a steering wheel, an accelerator, and a brake.

The input means includes a plurality of switches, buttons, and the like for an operation, such as a direction indicator, a tail lamp, a head lamp, a brush, and the like depending on vehicle driving.

The output means includes a display unit displaying information, a speaker outputting music, effect sound, and warning sound, a dashboard of the vehicle, and various states. The output means outputs state information regarding an overall current operation of a vehicle, such as speed information, a lamp turn-on situation, and the like.

In particular, when an error occurs in the vehicle, the output means outputs a warning corresponding to the error and may output a predetermined image through the display unit. In this case, the warning of the vehicle may be output in at least one form among warning sound of sound or voice, a warning lamp, a warning message, and a warning image.

The data unit 120 stores driving data depending on the vehicle driving, reference data for determining whether the vehicle is erroneous, and data generated while the vehicle is driven. Further, the data unit 120 stores data input through the image input unit 150 and processed as an image or a moving picture by the processing unit 160 and information on a moving object detected by the object detecting unit 170.

The driving unit 130 controls the respective components of the vehicle to operate according to the input by the operation means of the interface unit 140 and a control command of the control unit 110 to allow the vehicle to move and be driven according to the operation of the driver. The driving unit 130 directly controls driving of the vehicle components such as the engine, the transmission, and the brake according to the control command.

The image input unit 150 is constituted by a plurality of cameras installed at the front and the rear of the vehicle to input a peripheral image of the vehicle. In this case, the image input unit 150 includes a wide-image angle wide-angle lens. For example, a fish lens may be used.

The image processing unit 160 converts an image input from the image input unit 150 to generate the converted image as image or moving picture data. The generated data is stored in the data unit 120 by the control unit 110.

The object detecting unit 170 extracts keypoints from the image and tracks the corresponding keypoints in order to analyze a motion of the moving object (a target vehicle or human body) as a target from the data of the image processing unit 160.

The object detecting unit 170 estimates rotation and parallel movement components of an own vehicle based on a motion of the keypoints and extracts only keypoints for a background among all keypoints of which motions are estimated based on the estimated rotation and parallel movement components. The object detecting unit 170 warps the current image from a past image by the unit of a lattice by using the motion of the background feature and generates a difference image between the warped image and the current image.

The object detecting unit 170 detects the moving object from the difference image and temporally detects the motion of the detected moving object. The object detecting unit 170 determines whether to approach a driving route of the own vehicle by using tracking information of the moving object.

When the object detecting unit 170 determines that moving object approaches the driving route of the own vehicle, the object detecting unit 170 inputs information on the determination in the control unit 110. In this case, the control unit 110 displays an image of the approaching object through the output means of the interface unit 140 and further, outputs predetermined warning sound to allow the driver to detect the approach of the moving object.

In this case, the object detecting unit 170 may be divided into keypoints extracting unit (not illustrated), a motion tracking unit (not illustrated), and a difference image extracting unit (not illustrated).

The control unit 110 controls a predetermined lamp to be turned on or controls turn-on or off of the direction indicator according to the operation of the switch by the interface unit 140 and controls a vehicle speed to accelerate or decelerate the vehicle to correspond to an operation of an accelerator or the brake.

The control unit 110 senses the error of the vehicle and allows the resulting warning to be output through the output means of the interface unit 140. In particular, when the moving object is sensed by the object detecting unit 170, the control unit 110 controls information on the sensed moving object to be output as the warning through the output means of the interface unit 140.

Hereinafter, the detection of the moving object by the object detecting unit 170 will be described with reference to drawings.

Figure 2:
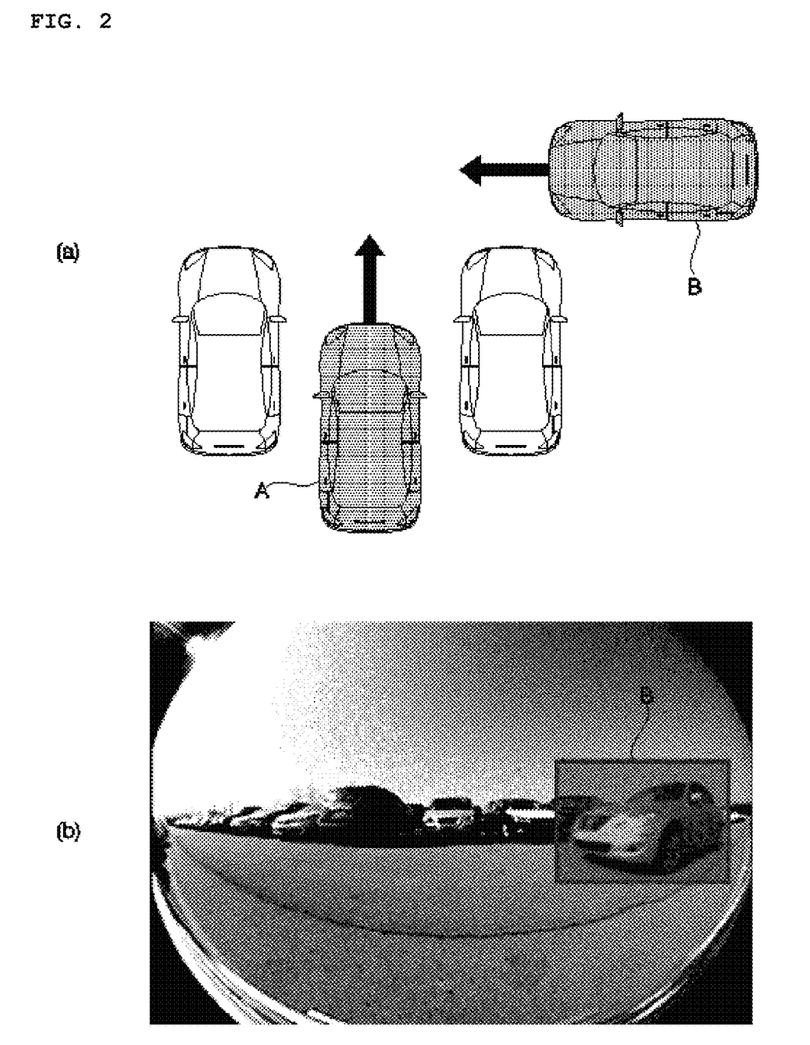
FIG. 2 is an exemplary diagram illustrating an exemplary embodiment of detecting an approaching object of the vehicle system for detecting an object according to the exemplary embodiment of the present invention.
Figure 3:
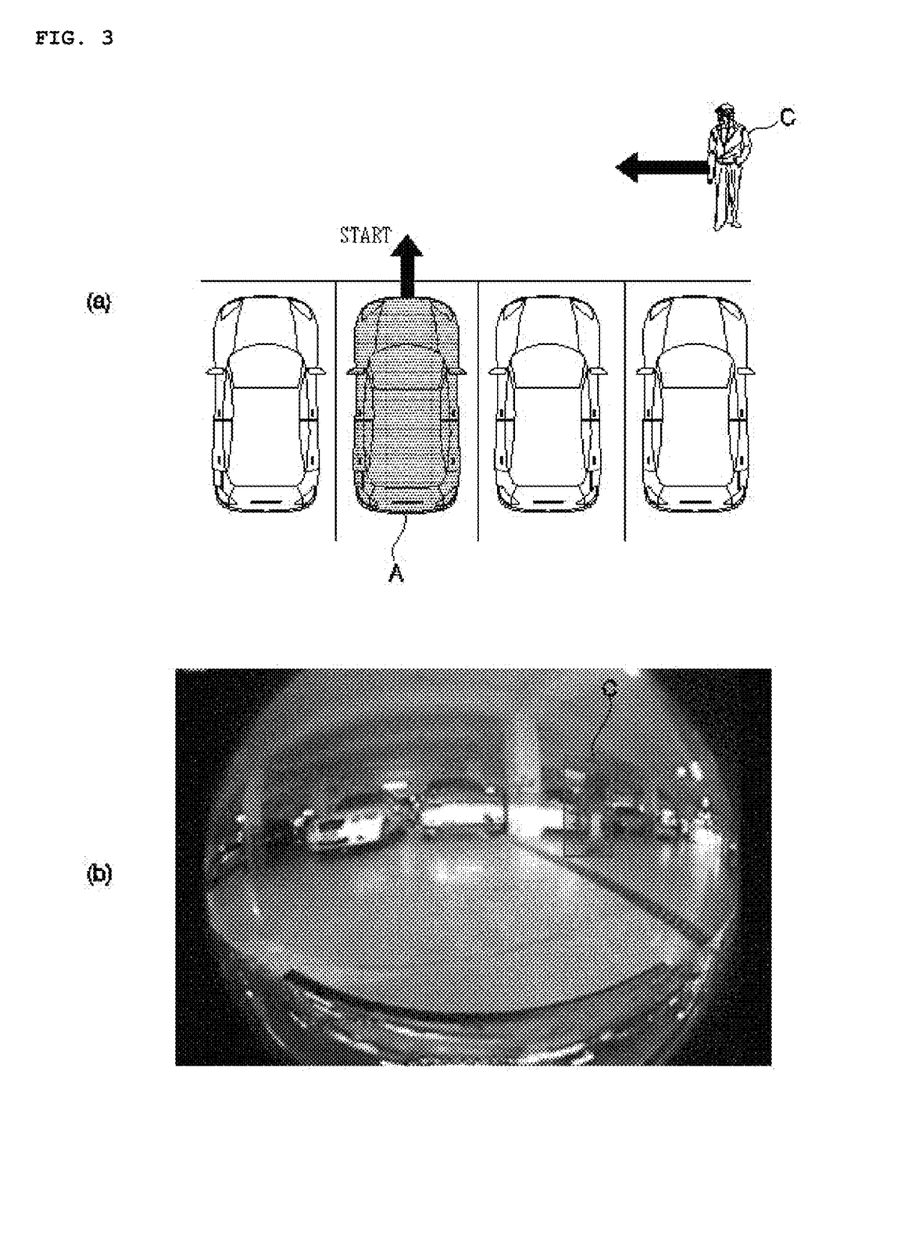
FIG. 3 is an exemplary diagram illustrating an exemplary embodiment of detecting an approaching human body of the vehicle system for detecting an object according to the exemplary embodiment of the present invention.

FIG. 2 is an exemplary diagram illustrating an exemplary embodiment of detecting an approaching object of the vehicle system for detecting an object according to the exemplary embodiment of the present invention. FIG. 3 is an exemplary diagram illustrating an exemplary embodiment of detecting an approaching human body of the vehicle system for detecting an object according to the exemplary embodiment of the present invention.

As illustrated in FIG. 2, the image captured from the image input unit 150 mounted at the front or the rear of the vehicle is converted by the image processing unit 160.

The object detecting unit 170 analyzes the image data of the image processing unit 160 to sense the moving object approaching the driving route of the own vehicle, for example, the vehicle or human body positioned around the own vehicle. The control unit 110 allows the warning by the object approach to be output through the interface unit 140 with respect to the sensed moving object.

As illustrated in FIG. 2A, when an own vehicle A is driven in a first direction, a moving object B approaches in a second direction, for example, from a right side of the own vehicle A. For example, when the own vehicle evacuates from a parking lot, a moving vehicle that is driven at the right side may approach the own vehicle.

As illustrated in FIG. 3A, a human body C which is the moving object may approach the own vehicle A.

Since other vehicles are positioned at left and right sides of the own vehicle A, a view may not be secured and a blind spot is generated, and as a result, the driver may not detect the moving object B or C.

In this case, the image input unit 150 is provided at the front of the vehicle to photograph an area including the blind spot of the driver at a wide image angle.

Since the image processing unit 160 converts the photographed area and inputs the converted area as the image data, the image is output onto a screen through the output means of the interface unit 140.

As illustrated in FIGS. 2B and 3B, the moving object is photographed and displayed.

When the image is consecutively input through the image input unit 150 and converted by the image processing unit 160, the object detecting unit 170 analyzes the corresponding image to estimate a motion of the own vehicle A and determines whether the moving object threatens movement of the own vehicle A to select an approaching object candidate.

That is, the object detecting unit 170 distinguishes the moving object B or C approaching the movement route of the own vehicle A among a plurality of objects included in the image to select the candidate.

The object detecting unit 170 finally detects the moving object based on attributes such as continuity, a position, and the like of the selected candidates and the control unit 110 gives the warning to the driver by displaying the moving object B or C differently from other objects through the interface unit 140 with respect to the moving object to assist the driver to perform safe driving. In this case, the control unit 110 may allow predetermined warning sound to be output through the interface unit 140.

In this case, since the image input through the image input unit 150 is distorted due to the wide image angle, the image processing unit 160 processes the image so as to minimize the resulting error.

When the own vehicle A moves, the motion exists even in the stopped background component, and as a result, the object detecting unit 170 detects the object except for the resulting influence. In order to remove the influence by the motion of the own vehicle A, the motion of the own vehicle A is estimated by using the motion of the background component in the image.

In this case, when the object detecting unit 170 estimates the motion generated in the image, the object detecting unit 170 does not estimate the motion with respect to all image pixels but estimates the motion for only the background component based on the keypoints. As a result, rapid processing may be achieved in real time.

The object detecting unit 170 selects only keypoints having a high possibility that the keypoints will be the background, and selects a background feature by using the motion of the own vehicle, estimates a current background image based on the selected background feature, and calculates a difference between the estimated background image and the input image to detect the moving object.

Figure 4:
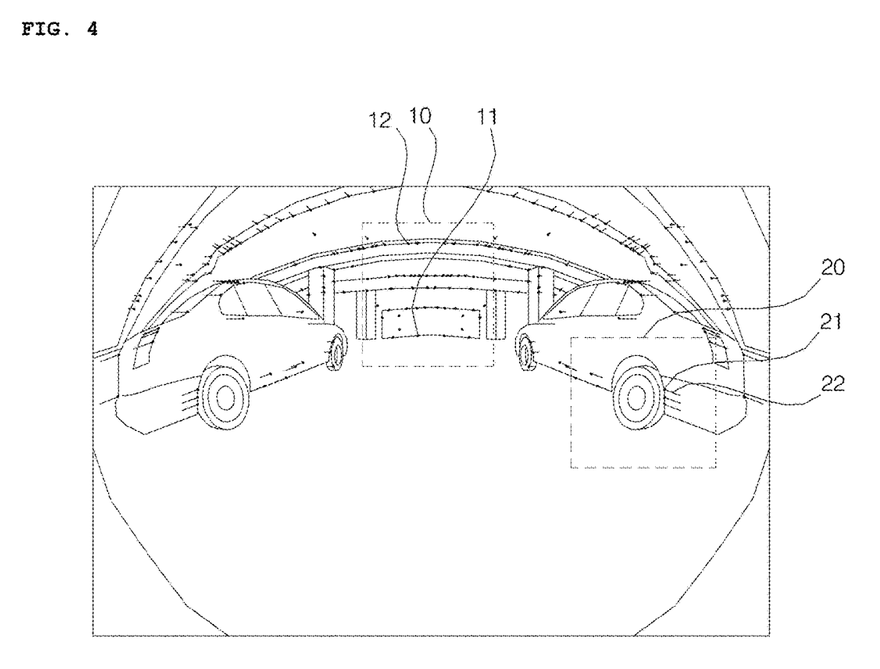
FIG. 4 is an exemplary diagram illustrating an exemplary embodiment of extracting keypoints of the vehicle system for detecting an object according to the exemplary embodiment of the present invention.

FIG. 4 is an exemplary diagram illustrating an exemplary embodiment of extracting keypoints of the vehicle system for detecting an object according to the exemplary embodiment of the present invention.

The object detecting unit 170 estimates the motion of the moving object B or C based on keypoints as described above.

As illustrated in FIG. 4, the object detecting unit 170 extracts the keypoints from a corner or a contour line which becomes the background in the images consecutively input from the image input unit 150.

The object detecting unit 170 extracts a plurality of keypoints from the input image and may extract a first keypoint and a second keypoint 12 from a first area 10 and a third keypoint 21 from a second area 20. The object detecting unit 170 may extract the keypoints from an edge of a ceiling or a pole of the parking lot in the first area 10 and extract the keypoints from the parked vehicle in the second area 20. Multiple keypoints are extracted in addition to the first to third keypoints 11 to 13.

The object detecting unit 170 estimates the motion in the consecutively input images with respect to the extracted keypoints.

Since the images are consecutively input, when images of a first time and a second time are compared and the same keypoints of the images match each other, movement of the keypoints may be displayed by a line.

In this case, it is displayed that keypoints for a background part in the image does not move in an actual situation, but as the own vehicle moves, the background relatively moves, and as a result, the movement of the own vehicle may be inversely estimated in accordance with the movement of the keypoints. When the moving object exists in the image, the line is displayed in a different direction from the background feature, and as a result, it may be verified that the corresponding object is the moving object.

The first and second keypoints 11 and 12 of the first area 10 are displayed in the form of a spot or a short line, while the second area 20 is displayed in the form of a line extended from the keypoints.

Since the first area 10 is positioned at a long distance from the own vehicle and positioned in a progress direction of the own vehicle, the first area 10 is displayed by the spot or the short line and as the second area 20 is close to the own vehicle and the own vehicle moves, the direction of the line is displayed.

Therefore, the object detecting unit 170 may estimate the motion that the own vehicle moves toward the first area 10.

Figure 5:
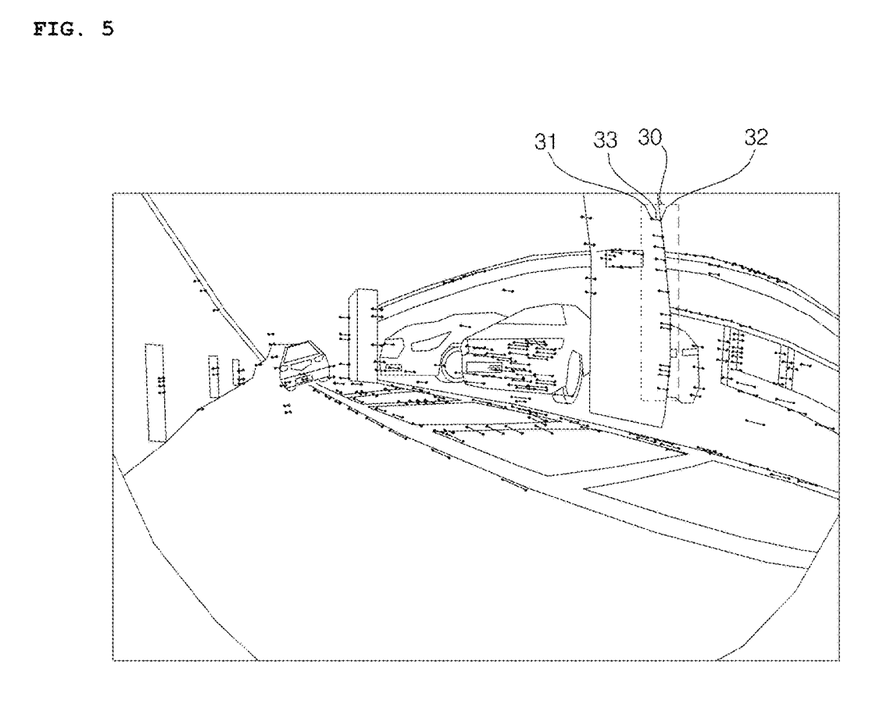
FIG. 5 is an exemplary diagram illustrating an exemplary embodiment of extracting keypoints by movement of a background point of the vehicle system for detecting an object according to the exemplary embodiment of the present invention.

FIG. 5 is an exemplary diagram illustrating an exemplary embodiment of extracting keypoints by movement of a background point of the vehicle system for detecting an object according to the exemplary embodiment of the present invention.

As described above, the object detecting unit 170 analyzes the motion of the own vehicle A and analyzes the approach of the moving object B or C based on the analyzed motion in order to extract the object approaching the own vehicle A.

The object detecting unit 170 detects an area having the movement and a different motion of the background component, which occur by the movement of the own vehicle A in order to extract the object approaching the own vehicle A between the moving objects B and C.

The object detecting unit 170 estimates the motion of the own vehicle A by using the features extracted from the background component tracked in FIG. 4, that is, a vector movement component of the background feature.

Since the background feature does not actually move, but it is displayed that the background feature moves in the image due to the motion of the own vehicle A, the motion of the background feature is determined by a change in position or angle of the image input unit 150 before and after the movement.

Accordingly, the object detecting unit 170 determines whether the background feature before and after the movement of the own vehicle A satisfies an epipolar constraint depending on the change in position or angle of the image input unit 150. For example, it is assumed that a lot of features among all the features belong to the background and the case in which the multiple features satisfy the epipolar constraint is determined as a change in final position or angle of the image input unit 150. In this case, the epipolar constraint as a condition for processing a 2D problem in a 1D in matching images photographed by two cameras and analyzing a speed or mobility therefrom relates to relative movement between two cameras.

The object detecting unit 170 repeatedly calculates such a process and excludes the features having different motions from the own vehicle A. As a result, accuracy of a result by the motion estimation is improved.

Accordingly, as illustrated in FIG. 5, the movement of the plurality of features are displayed by the line and in this case, a feature having a different movement characteristic is excluded to distinguish the background feature. As described in FIG. 4 above, since the movement line of the feature varies depending on the movement direction of the own vehicle and the position of the background, the motion of the own vehicle is estimated based thereon.

For example, by the features which become the stopped backgrounds such as a parking line and the pole and the movement line of each feature in the image of the parking lot, the motion of the own vehicle may be estimated. When a fourth feature 31 for the pole is extracted in the third area 30 of the image and the feature moves by the motion of the own vehicle (32), a movement line 33 connecting the fourth feature 31 and the feature is formed. Since the movement line is relatively shown by the motion of the own vehicle, the motion of the own vehicle is estimated according to the direction and the length of the movement line.

Since a left diagonal motion of the movement line 33 of the fourth feature 31 is displayed and the movement line of the feature is displayed in the form of the spot or the short line at the left side of the image, it can be seen that the vehicle moves in a left diagonal direction of the image.

Figure 6:
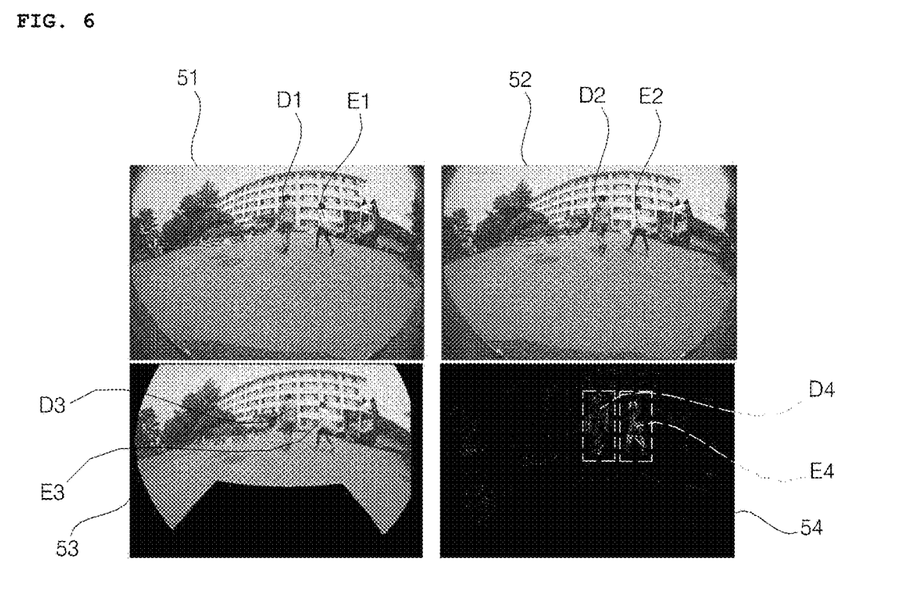
FIG. 6 is an exemplary diagram illustrating an exemplary embodiment of calculating difference images of a plurality of images of the vehicle system for detecting an object according to the exemplary embodiment of the present invention.

FIG. 6 is an exemplary diagram illustrating an exemplary embodiment of calculating difference images of a plurality of images of the vehicle system for detecting an object according to the exemplary embodiment of the present invention.

When the image including the moving object is compared with an image with time, an area representing a difference between the images is generated. Therefore, the object detecting unit 170 detects the area representing the difference and analyzes the detected area by using a result based on the feature, in particular, a result of estimating the motion of the own vehicle using the background feature to distinguish the moving object approaching the own vehicle A. The background image is estimated by the unit of the lattice.

As illustrated in FIG. 6, the object detecting unit 170 extracts a warping image 53 of FIG. 6C from a previous image (an image input at a t-1 time) 51 illustrated in FIG. 6A and a current image (an image input at a t time) 52 of FIG. 6B in order to detect a moving object of which a feature is not detected, that is, with respect to an object of which a feature is not detected. Further, the object detecting unit 170 extracts a moving object D or E by generating a difference image 54 of FIG. 6D representing a difference between the warping image 53 and the current image 52.

In this case, the object detecting unit 170 captures an area in the previous image (image input at the t-1 time) 51 by dividing the current image 52 into lattice units having a predetermined size and acquiring the position of each apex in the previous image (image input at the t-1 time) 51 with respect to four apexes (lattice points) constituting each lattice, and warps the captured area to an area corresponding to the current image 52. In this case, the positions of the respective lattice points are estimated by using the motion of the background feature. The background feature may be extracted as described in FIGS. 4 and 5 above.

As a result, the warping image 53 is generated.

Since the previous image 51 is used as the warping image 53 warped by the unit of the lattice, the area which becomes the background is normally displayed, but a normal warping result may not be captured in the area in which the object moves. The difference between the current image 52 and the warping image 53 occurs with respect to the area in which the object moves.

That is, a moving object D1 or E1 of the previous image 51 exists as a moving object D2 or E2 even in the current image 52, but the background is normally displayed in the warping image 53, but a moving object D3 or E3 cannot be normally warped due to actual movement of the moving object.

As a result, the object detecting unit 170 generates the difference image 54 between the current image 52 and the warping image 53 to detect only a moving object D4 or E4 except for the background with respect to the area in which the object moves.

Figure 7:
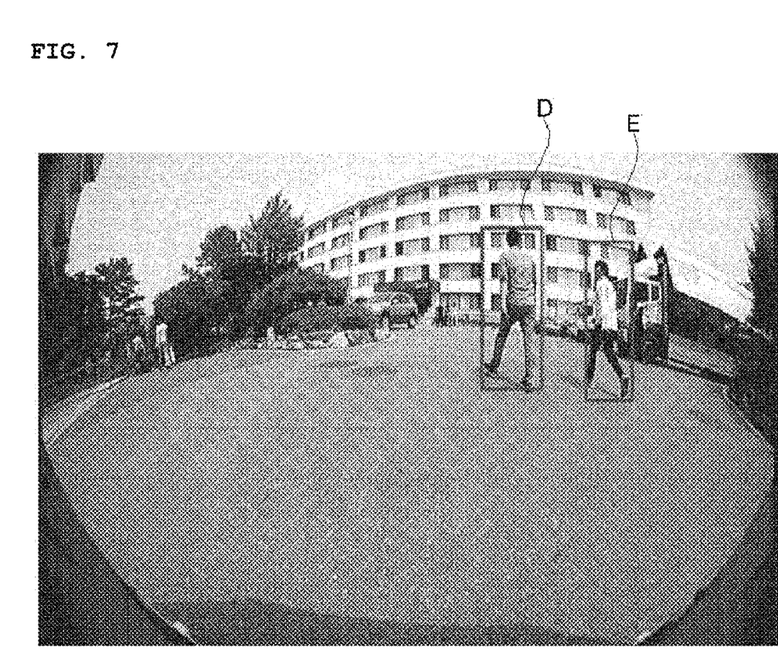
FIG. 7 is an exemplary diagram illustrating an exemplary embodiment of outputting a warning to an approaching moving object of the vehicle system for detecting an object according to the exemplary embodiment of the present invention.

FIG. 7 is an exemplary diagram illustrating an exemplary embodiment of outputting a warning to an approaching moving object of the vehicle system for detecting an object according to the exemplary embodiment of the present invention.

With respect to the difference image 54 generated in FIG. 6D described above, the object detecting unit 170 detects an area in which a difference value of pixels is large and the pixels are clustered as an area in which the moving object D or E exists.

The object detecting unit 170 analyzes a movement tendency of the object through temporal tracking with respect to the area in which the moving object D or E exists.

In this case, when as the movement tendency of the object, the object is toward the driving route of the own vehicle or moves on the driving route, the object detecting unit 170 determines the corresponding object as the moving object approaching the own vehicle.

As a result, the object detecting unit 170 inputs information on the moving object in the control unit 110 and the control unit 110 generates a warning signal to correspond thereto and outputs the generated warning signal through the output means of the interface unit 140. In this case, the warning signal may be output in at least one form among predetermined warning sound, a predetermined warning lamp, a predetermined warning message, and a predetermined image.

The control unit 110 may display the photographed image through the display means, and distinguish the moving object D or E from other areas in the image and display the moving object D or E.

Figure 8:
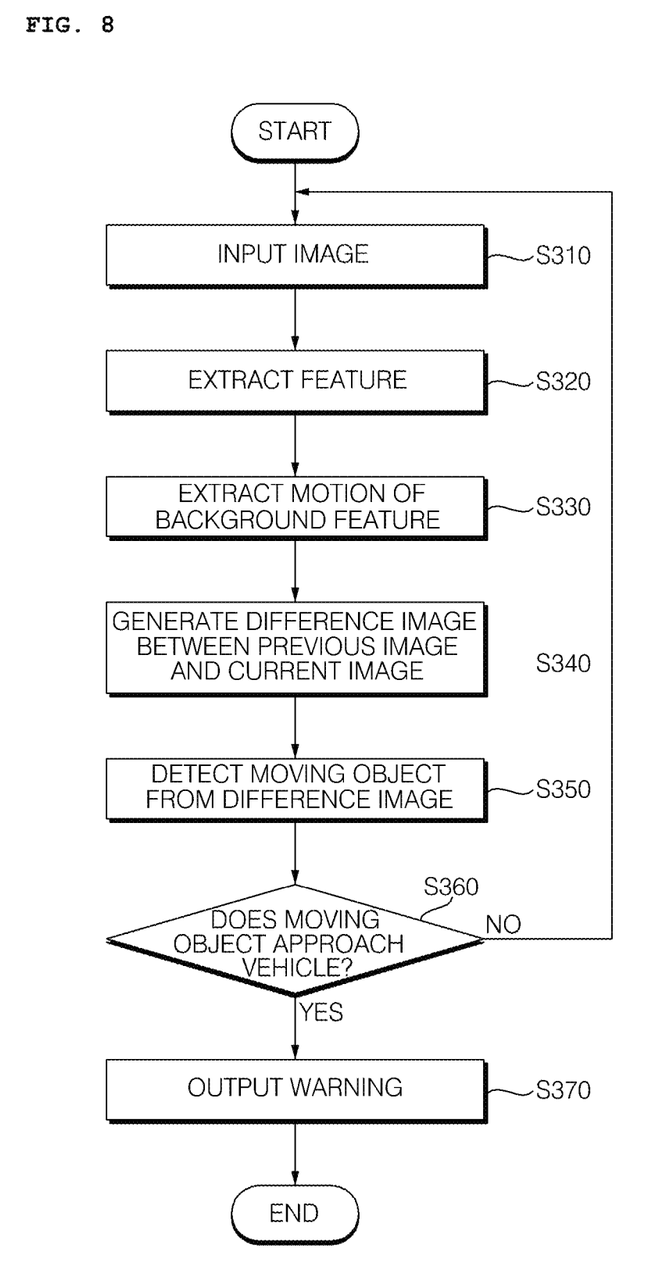
FIG. 8 is a flowchart illustrating an operation method of a vehicle system for detecting an object according to another exemplary embodiment of the present invention.

FIG. 8 is a flowchart illustrating an operation method of a vehicle system for detecting an object according to another exemplary embodiment of the present invention.

As illustrated in FIG. 8, in the present invention, when an image is photographed and input from an image input unit 150 (S310), the image is converted by an image processing unit 160.

An object detecting unit 170 analyzes the image to extract a feature from the image (S320).

The object detecting unit 170 distinguishes a feature of an area which becomes a background among a plurality of features and extracts a motion of the feature which become the background, that is, a background feature (S330).

In this case, when the object detecting unit 170 estimates the motion generated in the image, the object detecting unit 170 does not estimate the motion with respect to all the image pixels but estimates the motion for only the background component based on the feature.

A difference image between a previous image and a current image is generated based on the motion of the background feature (S340). A moving object is detected from the difference image (S350).

With respect to a moving object of which a feature is difficult to extract, the previous image and the current image are warped and thereafter, a difference image between the warping image and the current image is generated to detect the moving object as described in FIG. 6 above.

In this case, the movement of the own vehicle A may be estimated based on the motion of the background and the background feature moves with the movement of the own vehicle A, and as a result, an area having a motion different from the motion is detected to detect the moving object.

Therefore, since a moving object of which the feature is unclear is detected based on the background, the corresponding moving object may be easily detected.

The motion of the detected moving object is analyzed to determine whether the moving object approaches the vehicle (S360).

In this case, the object detecting unit 170 analyzes a movement tendency of the object through temporal tracking with respect to an area in which the moving object exists and when as the movement tendency of the object, the object is toward the driving route of the own vehicle or moves on the driving route, the object detecting unit 170 determines the corresponding object as the moving object approaching the own vehicle.

When the moving object approaches the vehicle exists, the control unit 110 outputs a warning therefor through an output means (S370). The control unit 110 may output a situation in which the moving object approaches the vehicle on a display as an image through the output means and outputs the warning by at least one combination of the warning message, the warning sound, the warning voice, and the warning lamp.

When the moving object approaching the vehicle does not exist, the control unit 110 allows the operation to be repeatedly performed to continuously monitor the moving object approaching the vehicle and give a warning therefor.

As a result, in the present invention, since the moving object is detected by using the feature for the background, a load by the detection of the moving object is small, and as a result, rapid calculation may be achieved and since the background is used even though the feature of the moving object is unclear, the moving object may be easily detected.

Unless explicitly described otherwise, a term "including", "comprising", or "having" disclosed hereinabove any components will be understood to imply the inclusion of other components but not the exclusion but further inclusion of any other components.

While the exemplary embodiments of the present invention have been illustrated and described above, the present invention is not limited to the aforementioned specific exemplary embodiments, various modifications may be made by a person with ordinary skill in the art to which the present invention pertains without departing from the subject matters of the present invention that are claimed in the claims, and these modifications should not be appreciated individually from the technical spirit or prospect of the present invention.

What is claimed is:

1. A vehicle system for detecting an object comprising:
    at least one camera installed at a front or a rear of a vehicle to capture images, in a vicinity of the vehicle, including a previous image and a current image which are consecutively captured;
    an input and output device including a display screen and a speaker; and
    circuitry including a microprocessor and configured to:
        convert the images input from the at least one camera;
        extract points from at least one of a corner, an edge, and a contour line from a background of the images to detect a moving object from an area where the points are extracted;
        generate a warping image using the previous image by warping areas in the previous image to correspond to the same areas in the current image;
        generate a difference image which shows a difference between the warping image and the current image;
        detect the moving object from an area where the points are not extracted based on the difference image;
        determine if the moving object, detected from the area where the points are extracted or the area where the points are not extracted, approaches the vehicle; and output a warning signal through at least one of the display screen and the speaker if the moving object approaches the vehicle.

2. The system of claim 1, wherein the at least one camera includes a wide angle lens.

3. The system of claim 2, wherein the at least one camera includes a fish lens.

4. The system of claim 1, wherein the circuitry is configured to extract the points from the background among a plurality of points of the images as a background feature and track a motion of the background feature in consecutively input images to detect the moving object.

5. The system of claim 4, wherein the circuitry is configured to estimate rotation and movement of the vehicle based on a motion of the extracted points and extract only the points corresponding to the background among all the extracted points as the background feature based on the motion of the vehicle.

6. The system of claim 4, wherein the circuitry is configured to divide the current image into lattice units having a predetermined size and calculate, with respect to lattice points which are four apexes constituting each lattice, a position of the previous image corresponding to the lattice points to warp an area of the lattice points in the previous image to an area corresponding to the current image.

7. The system of claim 6, wherein the circuitry is configured to calculate the position of the lattice points by using the motion of the background feature.

8. The system of claim 1, wherein the circuitry is configured to track a motion of the moving object to generate the warning signal when the moving object approaches a driving route of the vehicle or moves on the driving route.

9. The system of claim 1, wherein the warning signal includes at least one of warning sound, a warning message, a warning lamp, and a warning image.

10. An operation method of a vehicle system for detecting an object, the method comprising:
    capturing, by at least one camera of a vehicle, images in a vicinity of the vehicle, wherein the images includes a previous image and a current image which are consecutively captured;
    extracting, by circuitry including a microprocessor, points from at least one of a corner, an edge, and a contour line from a background of the images to detect a moving object from an area where the points are extracted;
    extracting, by the circuitry, a background feature for an area which becomes a background among the extracted points and detecting a motion of the background feature;
    analyzing, by the circuitry, a motion of the vehicle to correspond to the motion of the background feature and detecting the moving object from an area which moves differently from the motion of the vehicle;
    generating, by the circuitry, a warping image using the previous image by warping areas in the previous image to correspond to the same areas in the current image;
    generating, by the circuitry, a difference image which shows a difference between the warping image and the current image;
    detecting, by the circuitry, the moving object from an area where the points are not extracted based on the difference image;
    determining, by the circuitry, whether the moving object, detected from the area where the points are extracted or the area where the points are not extracted, approaches the vehicle; and
    outputting, by the circuitry, a warning signal through at least one of a display screen and a speaker when the moving object approaches the vehicle.

11. The method of claim 10, wherein rotation and movement of the vehicle are extracted based on a motion of the extracted points and only the points corresponding to the background among all the extracted points is extracted as the background feature based on the motion of the vehicle.

12. The method of claim 10, wherein the current image is divided into lattice units having a predetermined size and with respect to lattice points which are apexes constituting each lattice, a position of the previous image corresponding to the lattice points is calculated to warp an area of the lattice point in the previous image to an area corresponding to the current image.

13. The method of claim 12, wherein the position of the lattice points is calculated by using the motion of the background feature.

14. The method of claim 10, further comprising:
    tracking, by the circuitry, a motion of the moving object when detecting the moving object from the difference image; and
    determining, by the circuitry, that the moving object approaches the vehicle when the moving object approaches a driving route of the vehicle or moves on the driving route.

15. The method of claim 10, wherein the warning signal includes at least one of an image in which the moving object is displayed, a warning sound, a warning voice, a warning message, and a warning lamp.

* * * * *